Dec. 13, 1938.  K. E. PEILER ET AL  2,139,911
FOREHEARTH FOR MOLTEN GLASS
Filed April 1, 1937
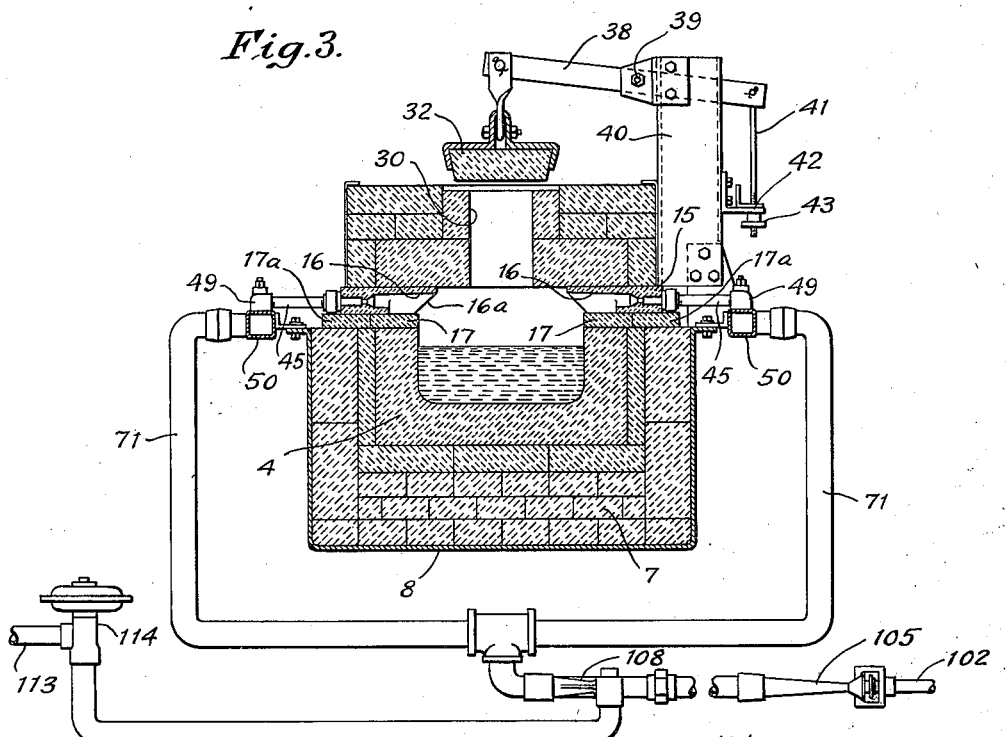
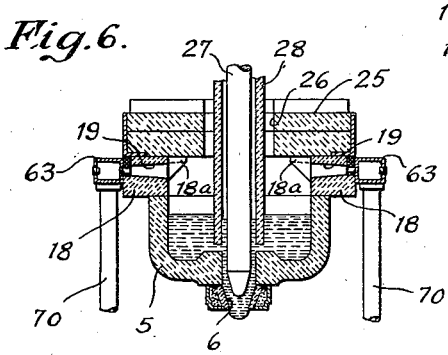
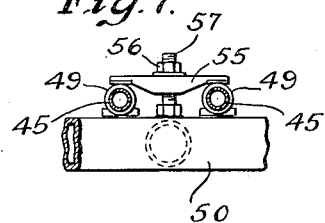
Inventors:
Karl E. Peiler and
William T. Barker, Jr.
by Brown & Parham
Attorneys.

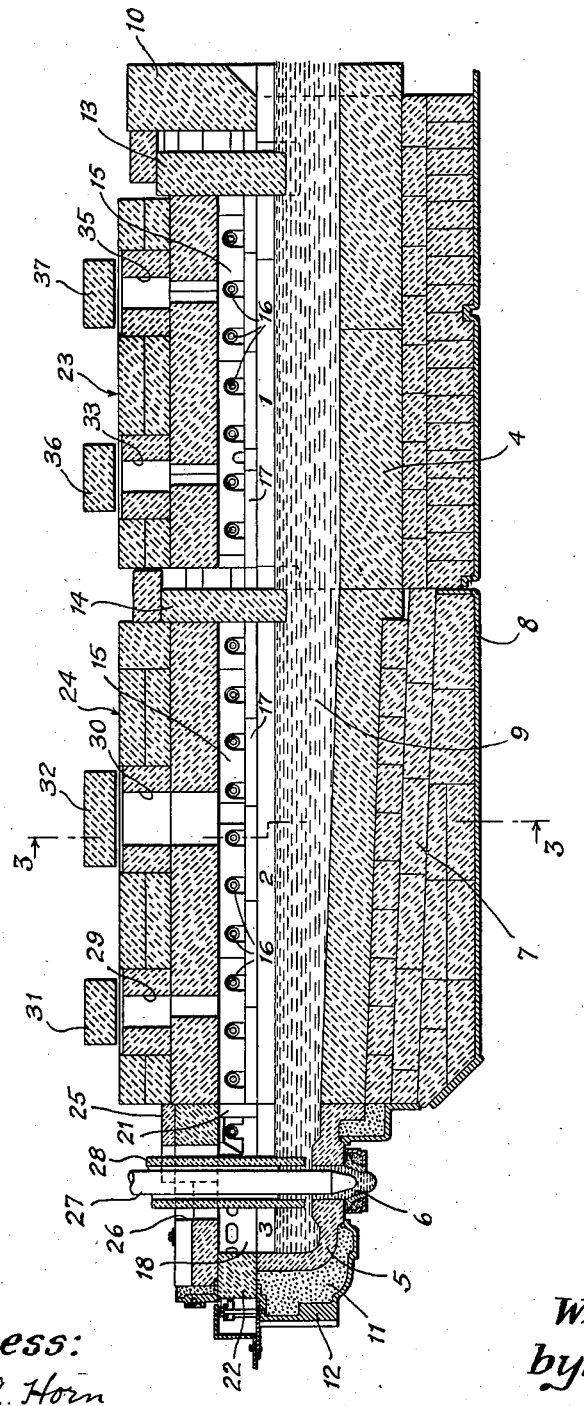

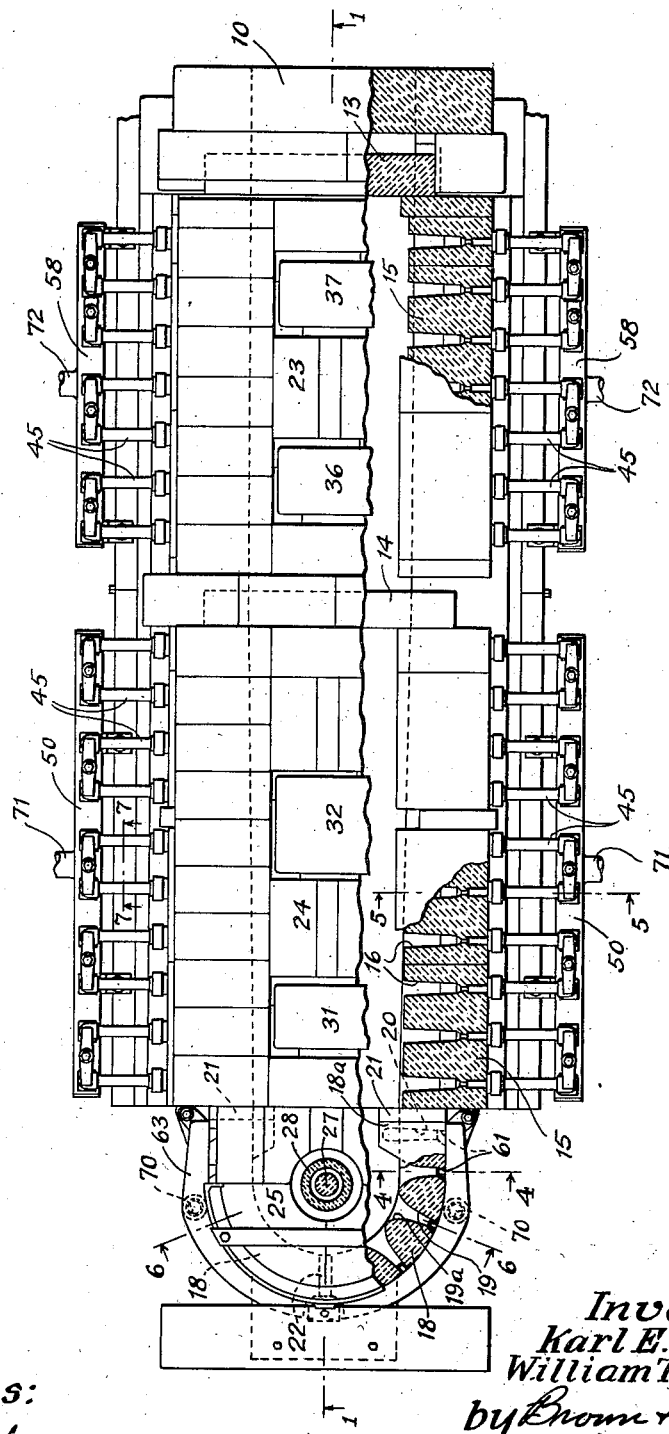

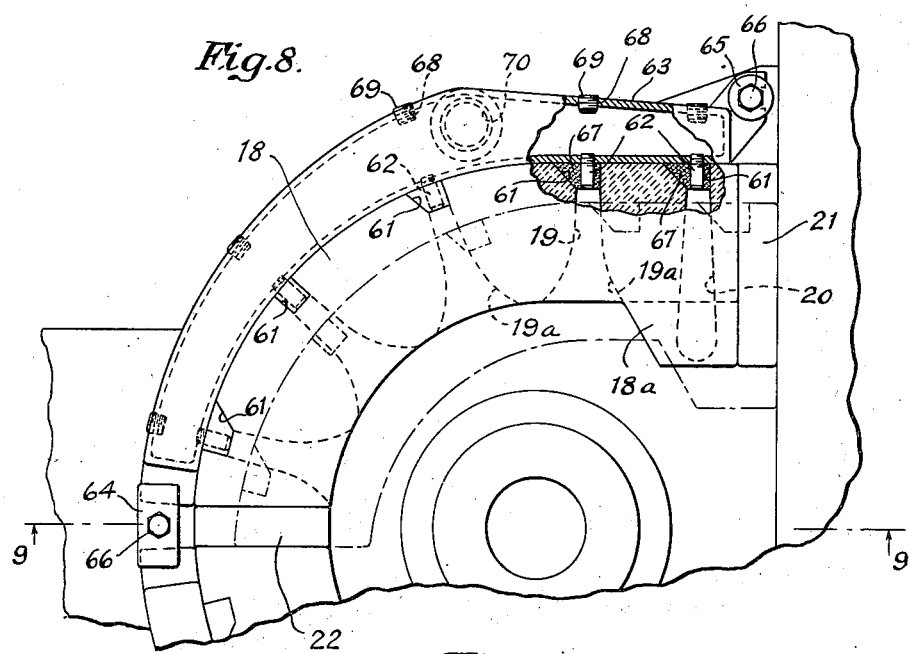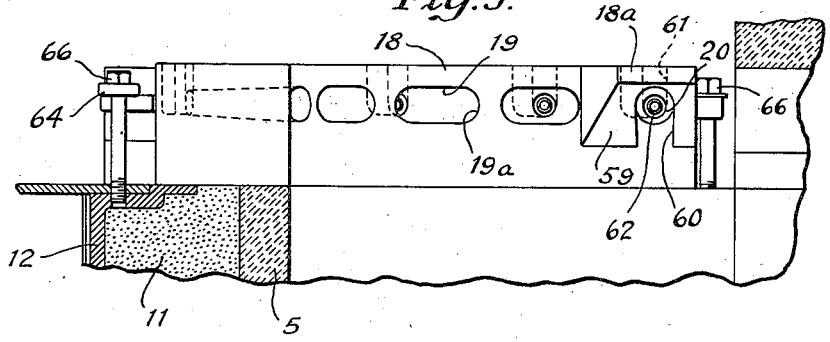

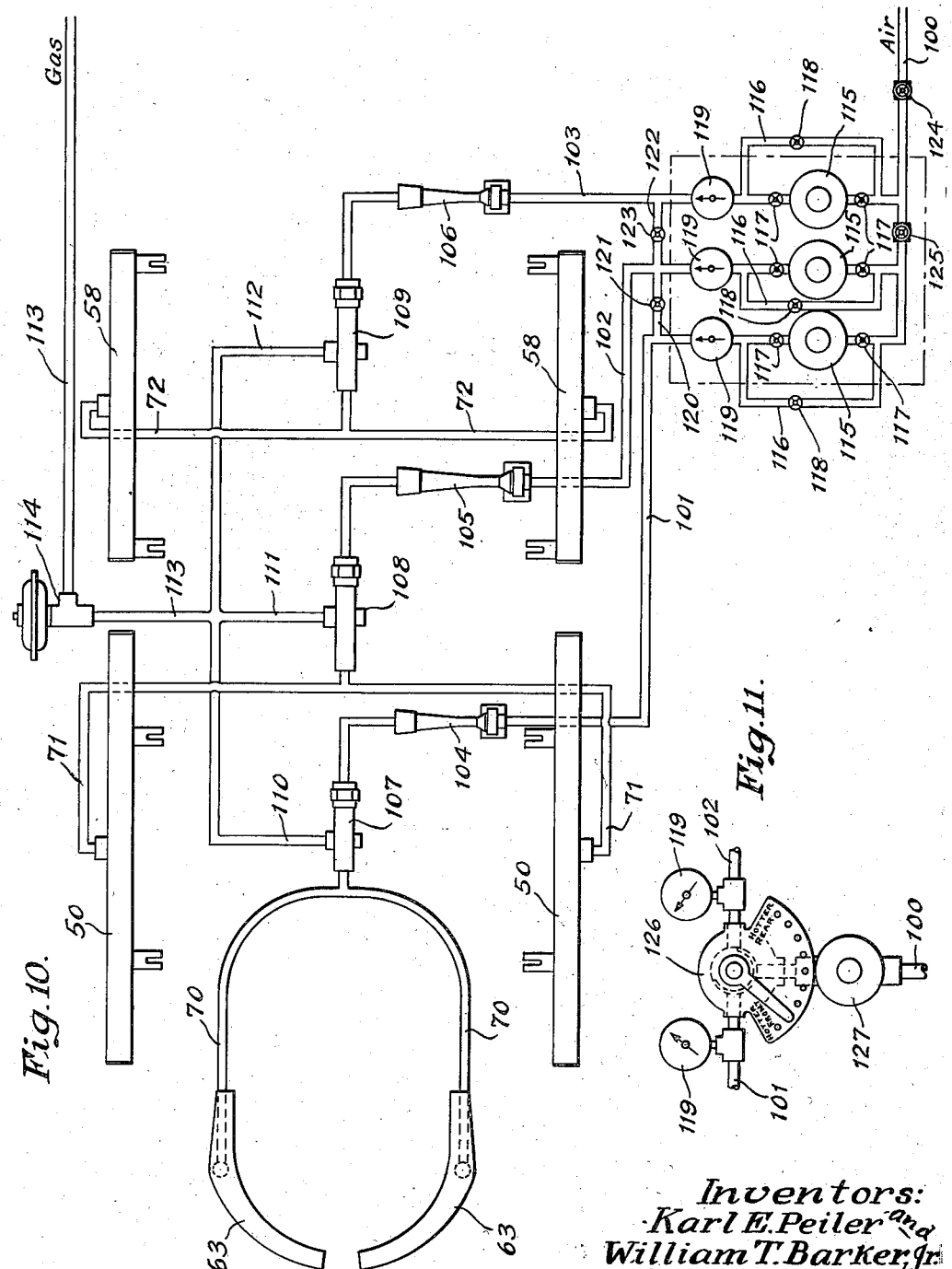

Patented Dec. 13, 1938

2,139,911

UNITED STATES PATENT OFFICE 2,139,911

FOREHEARTH FOR MOLTEN GLASS

Karl E. Peiler and William T. Barker, Jr., West Hartford, Conn., assignors to Hartford-Empire Company, Hartford, Conn., a corporation of Delaware Application April 1, 1937, Serial No. 134,356

17 Claims. (Cl. 49—54)

This invention relates to improvements in forehearths for receiving molten glass from a melting tank or like source of supply and for conducting such glass to a delivery chamber from which glass is to be fed, gathered, or otherwise removed.

The invention relates more particularly to forehearths of that type which comprise a rear so-called cooling section and a forward heating or glass homogenizing section, the outer end portion of which usually constitutes the delivery chamber from which glass is to be fed or otherwise removed.

The invention has still more particular reference to a forehearth of the type above mentioned which also is characterized by the provision of means at the sides of the forehearth for supplying heat to the interior thereof and means at the top of the forehearth or such a construction thereof, especially in the cooling section, as will permit loss of heat from the glass by radiation to and through the roof or top structure of the forehearth.

The glass entering the forehearth from the refining end of a melting tank usually has a temperature higher than that desired for the charges of glass which are to be obtained at the delivery or feeding end of the forehearth. It is then necessary to effect some cooling of the glass in the forehearth. Consequently, forehearths in use prior to this invention generally have included provisions, either in the nature of a controlled longitudinal opening or slot in the roof, removable insulation or removable blocks to permit cooling of the glass in the cooling section of the forehearth.

Such forehearths also generally have included provisions at the sides or top of the heating section for applying heat to the interior thereof and some of such forehearths have had means by which heat could be applied to the glass in the cooling section.

In such prior forehearths, the heating ordinarily has been accomplished by blowing flames or burning gases over the glass in the forehearth. The courses of currents of burning gases or of different portions of a flame mass in such a forehearth has been determined not only by the dynamic effects of the burner nozzles but also by draft conditions in the forehearth. Drafts to effect venting or the egress of heated gases or spent products of combustion have generally been produced by the use of dampered stacks or exit ports which have been located at a substantial height above the glass. The distribution of heat energy to the glass therefore necessarily has depended on the balance of the various factors and conditions which determined the course and character of the flames. In fact, the heat had to be blown and/or drawn where it was wanted by careful control of these factors and conditions.

The results have been, at best, more or less uncertain and haphazard. Variation of air pressures and winds, or slight air currents in a factory containing the forehearth frequently prevented or interfered with the accomplishment of the desired results. The amount of heat released by burning a certain amount of fuel in a forehearth depended on the type of flame which resulted from the relative ratios of air and fuel throughout the course of the flame and this also varied with varying draft conditions and often altered the temperatures very materially in different portions of the forehearth.

It, therefore, has been difficult with a forehearth equipped with cooling and heating means, generally as above described, to provide in actual use such a controlled distribution of temperature regulating effects both transversely and longitudinally of the glass in the forehearth as to produce desirable uniformity of temperature and condition of the glass in the delivery chamber of the forehearth.

Prior forehearths also have not been entirely or consistently satisfactory in their provisions for maintaining uniformity of temperature and homogeneity of the glass in their delivery chambers or in producing required changes of such temperature to meet changed operating conditions and while still providing the desired uniformity of temperature and homogeneity of the glass.

These difficulties in operating forehearths have persisted more or less despite numerous attempts to obviate or overcome them.

An object of the present invention is to provide a forehearth of such construction and so regulable and controllable that the above and other difficulties encountered in attempts to operate previous forehearths will be obviated or substantially improved.

A further object of the present invention is to provide a forehearth of such construction and having a heating system of such a character and so operable as to permit establishment of a satisfactory temperature gradient in the glass longitudinally of the forehearth and substantial uniformity of temperature of the glass transversely of the forehearth, and further to permit accurate and expeditious variation or adjustment of this gradient to meet different operating conditions or to produce different temperatures in the glass at the feed outlet or delivery point at different times.

A still further object of the invention is to provide in a forehearth of the character described temperature control and conditioning means which will have desirable stability of operation when operating conditions remain substantially constant and ease of control to satisfy changed operating conditions, or to produce specifically different results; will effect economy in the use of fuel to produce the heat required in the forehearth; and will have the requisite flexibility of control to meet any one of a wide range of different service conditions.

Another object of the invention is to provide a novel flexible and reliable heating system by which heating effects on and temperature regulation of the glass throughout the length and breadth of the forehearth may be accurately predetermined and dependably maintained as long as required and adjusted to meet changed conditions or to produce specifically different results at different times.

A still further object is to provide a forehearth having wall structures and heating means in such operative association with each other as to permit convenient and relatively easy repair, replacement or change of any part of the complete assembly or installation that is likely to require such repair, replacement or change.

Some of the foregoing objects and a forehearth and associate heating means for carrying them into effect are disclosed in our copending application for a Forehearth for molten glass, Serial No. 41,881, filed Sept. 24, 1935, of which the present application is a continuation in part.

According to the present invention, we apply distributed regulable heating effects to the glass in the forehearth by the combustion of premixed air and gas in combustion or firing tunnels in the sides of the forehearth and around the delivery chamber thereof. Fuel mixtures of predetermined regulable gas-air proportions and pressures are supplied by a fuel supply system which preferably permits independent adjustment and control of the mixtures supplied to the tunnels at the sides of the cooling section, the tunnels at sides of the heating section, and the tunnels in the walls of the delivery chamber, respectively. The arrangements preferably are such that practically complete combustion of the mixture that is supplied to each tunnel will be effected therein so that heating of the glass as a result of such combustion will be mainly by radiation of heat from the incandescent walls of and at the inner ends of the tunnels.

External air is excluded from the tunnels and the construction and operation of the means for allowing egress of spent products of combustion from the forehearth are such that like heating effects may be obtained by the combustion of the gas-air mixtures in the respective tunnels of each of the forehearth zones above mentioned and may be adjusted independently for the several zones and dependably maintained after each adjustment until a further adjustment thereof has been made.

We thus provide control of the temperature regulating conditions in successive zones of the forehearth. The temperature regulating effects of all the combustion tunnels in each of these zones may be adjusted in unison and to the same extent. By proper predetermination of the temperature regulating effects in the successive zones, we produce not only symmetrical temperature conditions transversely of any portion of the forehearth but such a temperature gradient longitudinally of the forehearth as is best suited to meet the particular operating conditions which exist at that time. This gradient may be dependably maintained as long as is desired but may be varied at will by adjustment of various controls of the gas-air mixture supply means to meet changed conditions or to effect different results at different times.

To carry out more specific objects of the invention, we have provided a novel gas-air mixture supply means having adjustable controls and suitably designed and constructed for practical application to the forehearth structure. We also have provided a construction of blocks and associate parts in the walls of the delivery chamber which will permit change of a part thereof while the associate parts of forehearth and of gas-air mixture supply means remain intact.

For a better understanding of the invention of the present application, reference may be had to the following description of a practical embodiment of the invention, as disclosed in the accompanying drawings, in which:

Figure 1 is a longitudinal vertical section through a forehearth of the present invention, the view being taken substantially along the line 1—1 of Fig. 2;

Fig. 2 is a plan view of the forehearth, with portions broken away to show combustion or firing tunnels in the walls of the forehearth, and showing also associate elements of our novel gas-air mixture supply system;

Fig. 3 is a transverse vertical section through the forehearth, substantially along the line 3—3 of Fig. 1;

Fig. 4 is an enlarged detail of one of the combustion tunnels and associate fuel mixture supply means of the delivery chamber, the view being an enlargement of a section substantially along the line 4—4 of Fig. 2;

Fig. 5 is a fragmentary view showing in enlarged form a section substantially along the line 5—5 of Fig. 2;

Fig. 6 is a transverse vertical section through the delivery chamber, the view being substantially along the line 6—6 of Fig. 2;

Fig. 7 is a fragmentary view partly in elevation and partly in section, showing the details of means for removably securing two adjacent fuel mixture supply nozzles in operative position, the view being an enlargement of a section taken substantially along the line 7—7 of Fig. 2;

Fig. 8 is an enlarged fragmentary plan view of a major portion of the delivery chamber, with the top structure thereof omitted and with certain parts broken away and shown in section, the view showing in full lines the tunnel blocks of the combustion walls of the delivery chamber in place and showing in dot and dash lines positions to which these blocks may be moved during the operation of changing the feed bowl of the delivery chamber;

Fig. 9 is a section substantially along the line 9—9 of Fig. 8 with the lower or feed bowl part of the delivery chamber structure broken away and with certain of the blocks of the combustion walls of Fig. 8 omitted;

Fig. 10 is a diagram, showing an arrangement of pipes and associated controls of the gas-air mixture supply means of the heating system of the present invention; and Fig. 11 is a view of a two-way air proportioning or distributing valve and associated elements which may be used in the gas-air mixture supply means in lieu of certain of the elements of this means as shown in Fig. 10.

Referring now more particularly to Fig. 1, a forehearth according to the present invention may include a rear or cooling section 1, a forward heating or homogenizing section 2 and a delivery chamber 3 at the outer end of the section 2. This forehearth is constructed of suitable materials so as to provide a refractory glass flow channel 4, the outer end portion of which, designated 5, constitutes a feed bowl having in its bottom a feed outlet 6. The glass flow channel 4 may be supported and insulated in any suitable known way, as by the insulating blocks 7, and the outer metallic casing 8, Figs. 1 and 3. Glass, as indicated at 9, may flow from a melting tank into and along the glass flow channel, filling such glass flow channel and the feed spout 5 to a predetermined level, such as that shown in Figs. 1 and 2. Only a small portion, designated 10, of a wall of the melting tank is shown, and the particular means for supporting the forehearth in proper association with the melting tank are lacking, as such means are well known in the art and can be readily supplied.

As shown in Fig. 1, the feed bowl is provided with granular insulation 11, held in place by an outer metallic casing 12.

The rear or cooling section 1 is separated, above the level of the glass in the flow channel, from the space above the glass in the supply tank by a transverse separator block 13. A similar transverse separator block 14 may be employed to separate the space above the glass in the cooling section from the like portion of the forward heating or homogenizing section of the forehearth.

The glass flow channel 4 is of substantially U-shape in cross section, as indicated by the particular section thereof in Fig. 3. The side walls of this glass flow channel support combustion or heat applying walls which extend from the separator block 13 at the rear end of the cooling section along the sides of the forehearth and around the delivery chamber at the outer end of the forehearth.

In the rear cooling section 1 and the forward heating section 2, exclusive of the delivery chamber 3, these combustion walls may comprise similar upper refractory blocks 15, having spaced combustion or firing tunnels 16 formed therein. These upper blocks 15 may rest upon inner and outer flat supporting blocks 17 and 17a which in turn may rest upon the sides of the glass flow channel and portions of its insulating outer structure, substantially as shown in Fig. 3.

The combustion wall above the feed spout 5 of the delivery chamber is of special construction and embodies novel features which will hereinafter be more specifically described. For the present, it is to be noted that this combustion wall comprises a pair of blocks 18 of generally arcuate shape, each having combustion or firing tunnels 19 and 20 therein. Side retaining filler blocks 21 are included in the combustion wall between the rear ends of the blocks 18 and the adjacent ends of the combustion walls of the side portions of the heating section 2. A similar retaining filler block 22 is provided between the two adjacent ends of the combustion tunnel blocks 18. The combustion tunnel blocks 18 are curved at their inner surfaces to conform to the contour of the upper edge or rim of the feed bowl 5.

A cover structure surmounts the combustion walls of the forehearth and comprises a section 23, constituting the top of the cooling section 1, a section 24, constituting the top of the heating section 2, and a section 25, constituting the top of the delivery chamber. These sections of the cover structure are shown as all having substantially flat lower surfaces located relatively close to the surface of the glass thereunder. The inner walls of the cover structure of course are refractory and may be backed by or covered by blocks, walls or materials having refractory characteristics but also having higher heat insulating qualities.

The section 25 of the cover structure of the delivery chamber may be provided with a vertical opening 26 to accommodate suitable mechanism for controlling the feeding of glass through the outlet 6. As shown, such a mechanism is represented by the fragmentary portions of the vertical plunger 27 and of the associate refractory tube 28. The operation of a mechanism which includes these members is well known in the art and such a feeding mechanism may include any suitable known means for supporting and operating these members.

The section 24 of the cover structure is shown as being provided with two spaced vents or exhaust outlets 29 and 30 respectively, controlled by movable closure blocks or dampers 31 and 32 respectively. These exhaust outlets preferably are in the longitudinal median section 24 of the cover structure and the number of such outlets and the positions and spacing thereof may be varied, if desired.

The section 23 of the cover structure likewise is provided in its longitudinal median portion with spaced vertical vents or exhaust outlets, indicated at 33 and 34 respectively. These outlets are controlled by movable closure blocks or dampers indicated at 36 and 37, respectively.

Each of these closure blocks or dampers 31, 32, 36 and 37 may be provided with any suitable mechanism for movably supporting it and adjusting its position relative to the upper end of the outlet that it controls. As shown in Fig. 3, the closure block 32 depends from the inner end of a lever 38 which is fulcrumed intermediate its ends at 39 on a fixed or stationary support 40. The outer end of the lever 38 carries an adjusting rod 41 having a threaded lower end portion depending through an opening in a bracket 42 and being provided at its lower end with a threaded nut 43 which bears against the under side of the bracket and by its contact therewith holds the closure block or damper 32 in adjusted position above the exhaust outlet 30. A similar mechanism may be provided for each of the other closure blocks or dampers.

As best seen in Figs. 3 and 5, each combustion or firing tunnel 16 has an inwardly enlarging generally conical main portion which opens through the inner surface of a block 15. This inner surface is beveled downwardly and outwardly. Consequently, the tunnel has a similarly beveled inner end, as indicated at 16a. The bottom wall of this tunnel may be cut away, as at 16b in Fig. 5, from the inner end or free edge of the tunnel for part of the length of the main portion thereof. A portion of the underlying block 17 thus is exposed to the combustion in the combustion tunnel 16 and in effect constitutes the bottom of that portion of the tunnel.

This block 17 is made of a refractory material of relatively high resistance to heat. The outer of the lower blocks 17a, need not be so highly resistant to heat but instead may have better heat insulating qualities.

The combustion or firing tunnel 16 is reduced at the outer end of the main or body portion thereof to provide a restricted inlet 16c and then is enlarged or counterbored outwardly of the inlet as at 16d, Fig. 5, to accommodate the tip 44 of a nozzle having a body 45. The tip 44 and body 45 of the nozzle are detachably connected by a coupling 46 which carries an outer slidable ring 47 by which asbestos packing, or other suitable packing material, indicated at 48, may be compacted against the outer surface of the combustion tunnel block to seal the coupling to that block. This will prevent ingress of air from the atmosphere around the nozzle tip to the outer end of the combustion tunnel. The ratio of gas to air in the fuel mixture delivered to the tunnel thus may be dependably maintained.

These tips may be replaced so that tips of different internal sizes may be used at different times. The tips used in an association with the combustion tunnels 16 of the combustion walls of the cooling section 1 may be of a different size internally from the tips employed for the combustion tunnels of the combustion wall of the heating section 2. Otherwise, the structures are the same for both combustion walls. While all the tips of the nozzles for each forehearth section or zone may be of the same size, it is within the purview of the invention to use tips of graduated sizes or of different size at different places along the length of that section or zone.

The nozzles are supplied with premixed air and gas which may be of such a composition and at a pressure such as to cause complete combustion of the mixture in the combustion or firing tunnels. Preferably, the tunnels 16 in the blocks 15 are sufficient in number and close enough together to cause practically the entire beveled inner surfaces of the blocks 15 to be heated to incandescence by the surface combustions in the tunnels and at the inner ends thereof.

As best seen in Fig. 5, the body 45 of each nozzle may be provided at its outer end with a coupling member in the form of an elbow 49. One branch of this elbow may threadedly engage the nozzle body 45 while the opening or bore of the other branch rests upon the flat upper surface of a manifold 50 in position to cover and register with an opening 51 in the top wall of that manifold. The manifold is carried by brackets 52 which are secured, as by fastening means 53, to a suitable stationary support, such as an out-turned flange 54 on the forehearth casing. Two adjacent nozzles may be held in place on the manifold by a clamping device, best seen in Fig. 7, which comprises a clamping bar 55 having end portions bearing upon the elbow couplings 49 of the pair of adjacent nozzles, the bar 55 being held in clamping position by a nut 56 on the shank of a stud 57. The stud 57 extends through the middle portion of the bar 55 and may be integral with or otherwise rigidly secured to the manifold 50. Sufficient of the devices shown in Fig. 7 will be provided at the desired places along the manifold to hold all the associate nozzles in their proper places. These devices and the couplings 46 may be conveniently manipulated to permit replacement of the tips of the nozzles when required.

The manifolds 50, shown in Figs. 3, 5 and 7, to which the foregoing description has been particularly directed, are located at the sides of the heating or homogenizing section 2, as best seen in Fig. 2. Similar manifolds, designated 58, are provided at the sides of the rear cooling section 1 and are connected with the bodies 45 of the nozzles which are associated with the combustion or firing tunnels 16 of the rear or cooling section. Devices such as shown in Figs. 5 and 7, and as hereinbefore described, are employed to connect the manifolds 58 with the nozzle bodies 45 for the rear or cooling section. The same reference characters have therefore been applied to these devices and they need not be further described.

The combustion or firing tunnels 19 in each block 18 of the combustion or heating walls of the delivery chamber 3 are generally conical in shape, except that they preferably are widened or laterally enlarged at their inner ends, as best seen at 19a in Figs. 2, 8 and 9.

The end portions of the blocks 18 at the entrance end of the delivery chamber may be formed to be substantially straight to correspond with the straight walls of the glass flow channel at that place. These substantially straight end portions of the blocks 18 have inward enlargements or projecting portions, as indicated at 18a, Figs. 2, 4, 6, 8 and 9. The combustion or firing tunnels 20 are formed through these enlarged end portions of the blocks 18 and are of inwardly enlarging shape, as best seen in Fig. 8. The inward extension 18a of the enlarged end portions of the blocks 18 are beveled downwardly and outwardly, as indicated at 59, Fig. 9, and are cut away from their lower surfaces upwardly to the inner ends of the firing or combustion tunnels, as indicated at 60.

The outer or receiving end portions of the firing or combustion tunnels 19 and 20 preferably are of the same size and are enlarged in upward directions by notches 61, Figs. 2, 8 and 9. These notches in each block 18 extend to the upper surface thereof and provide packing spaces around nozzles 62 which are carried by manifolds 63 and extend into the outer ends of the respective firing or combustion tunnels 19 and 20.

As shown to advantage in Figs. 2 and 8, the manifolds 63 conform in curvature to the exterior of the combustion walls of the delivery chamber, and fit closely against such walls. Clamping devices 64 and 65 for the manifolds overlie lugs or ears at the ends of the manifolds and include studs or bolts 66, which have their shanks secured in threaded openings in adjacent portions of the outer casing or frame work structure around the delivery chamber, as best seen for the bolt 66 in Fig. 9. The manifolds 63 rest on an outward step or shelf which extends around the delivery chamber structure, the arrangement being such that the nozzles 62 will be disposed entirely within the enlarged outer portions of the combustion or firing tunnels 19 and 20 when the manifolds are disposed as tightly as possible against the exterior of the combustion walls of the delivery chamber and are clamped down to their supporting shelf.

The notches 61, above referred to as packing spaces, are filled with a suitable packing material, such as clay luting, at the time the manifolds are applied to the combustion walls of the delivery chamber. Such packing material is tamped into place to fill the packing spaces around the nozzles 62, as indicated at 67 in Fig. 8. Air from the atmosphere thus will be excluded from the combustion or firing tunnels 19 and 20.

The nozzles 62 are short nipples which are threaded into suitable openings in the inner walls of the manifolds 63. Suitable openings 68, normally closed by threaded plugs 69, are provided in the outer walls of the manifolds 63 in alignment with the nozzles 62. When these plugs are removed, access may be had to the nozzles 62 to clean them or to facilitate their removal for replacement by other nozzles of the same or a different size.

The manifolds 63 are supplied with premixed gas and air by pipes 70 which may be connected with the bottoms of such manifolds.

In operation of a glass feeding forehearth, it is necessary at frequent intervals to change the feed bowl. In order to permit a change of feed bowls while the manifolds 63 and their connections remain intact, the combustion walls above the feed bowl, as hereinbefore described, may be dismantled without disturbing the manifolds. Thus, after the top section 25 of the forehearth structure has been removed, the relatively thin straight-sided filler blocks 21 and 22 may be readily removed, thereby leaving space for movement of the blocks 18 away from their associate manifolds in directions which are generally radial of the delivery chamber but are slightly toward the rear of the forehearth. Thus, as illustrated with reference to one of the blocks 18, as shown in Fig. 8, that block may be moved inwardly and rearwardly to the position indicated by the dot and dash lines. To afford adequate clearance for the nozzles 62 during such movement of the block 18, the notches 61 are made sufficiently wide and of appropriate shape or shapes in horizontal section, as shown best in Fig. 8, to permit the required movement of the block 18 without causing harmful contact of any of the nozzles 62 with a side wall of its notch. The clay luting or packing 67 will, of course, be broken loose, so that fresh packing or luting will be required on replacement of the blocks 18.

After inward removal of the blocks 18, they may be lifted clear of the forehearth structure and access then may be had to the feed spout to permit change thereof. After this has been accomplished in the usual way, the same or new blocks 18 may be restored to their operative positions simply by placing them inwardly and rearwardly of the positions which they are intended to occupy, then moving them outwardly until they occupy their proper positions. The nozzles 62 will then be disposed in the enlarged outer ends of the combustion or firing tunnels 19 and 20 and the fresh clay packing or luting may be tamped around the nozzles in the spaces 61. The retaining filler blocks 21 and 22 then may be restored to their operative positions, as shown in Fig. 8.

The manifolds 63 are provided with fuel supply pipes 70, as aforesaid. The manifolds 50 at the sides of the heating section are provided with fuel supply pipes 71 and the manifolds 58 at the sides of the rear or cooling section are provided with fuel supply pipes 72. Suitable mechanism, including these pipes, for supplying mixtures of gas and air of the desired proportion or proportions and at the desired pressure or pressures to the respective pairs of manifolds will now be described.

Such mechanism may include a pressure air main 100 which receives air under pressure from any suitable source of supply. The air main has branches 101, 102 and 103, respectively. These branches include air inspirators 104, 105 and 106, respectively, which draw in air from the atmosphere and thus dilute and reduce the pressure of the air passing through these inspirators. The resultant air in the lines 101, 102 and 103 passes to the inspirators of mixers 107, 108 and 109, respectively, which draw in gas from branches 110, 111 and 112 of a gas main 113. The mixer 107 thus will supply a predetermined mixture of gas and air under a predetermined pressure to the gas-air supply pipes 70. The mixers 108 and 109 will similarly supply predetermined gas-air mixture at predetermined pressures to the pipes 71—71 and 72—72, respectively. The gas from the main 113 is at a predetermined pressure, preferably that of the atmosphere being maintained at such pressure in the branches 110, 111 and 112 by a suitable governor-controlled pressure regulating device, indicated at 114 in Fig. 10.

In order to predetermine and regulably control the proportions of the gas and air supplied to the several pairs of manifolds, and, hence, to the combustion and firing tunnels of the cooling section, the heating section, and the delivery chamber of the forehearth, as well as the pressures at which such mixtures are supplied, the air main 100 and the branches thereof 101, 102 and 103, respectively, may be equipped with various pressure regulating and adjustable control devices. These may be used in various combinations and ways to produce a wide range of specifically different results.

In the arrangement shown in Fig. 10, each of the branches 101, 102 and 103 is provided with a reducing pressure regulator 115 which is located between the extremities of a by-pass conduit, designated 116. Valves 117 are provided in each of the respective branches of the air main at opposite sides of the regulator 115 and between the latter and the junctures of the ends of the associate by-pass conduit 116 with that branch of the air main. By closing the valves 117 of a branch 101, 102 or 103, the regulator of that branch may be cut out of the system and the air will pass through the by-pass 116, under the control of a valve 118 in that by-pass.

Pressure gauges 119 are provided for the branches 101, 102 and 103 downstream from the by-pass connections. The branches 101 and 102 may be interconnected downstream from the gauges 119 by a cross pipe 120 which is controlled by a valve 121. Likewise, a cross connection is provided between the branches 102 and 103 by a pipe 122 which is controlled by a valve 123.

A valve 124 may be provided in the air main upstream from all the branches 101, 102 and 103. Another valve, indicated at 125, may be provided in the air main at a place intermediate the junctures with that air main of the branches 102 and 103. All the valves and control devices above referred to have been shown diagrammatically, since per se they form no part of the present invention, but may be obtained as commercial units and installed at the places indicated.

These control devices may be used selectively and in numerous combinations to produce a wide range of different results which are useful in predetermining and adjusting the temperature gradients in the forehearth. For example, the valves 121 and 123 in the cross connections 120 and 122 may be closed, the by-passes of the respective branches 101, 102 and 103 likewise may be cut out of the air conducting system and air may then be supplied from the main 100 to the several branches 101, 102 and 103 at pressures which may be independently predetermined and maintained by selection of the settings of the respective reducing pressure regulators 115. The valves 124 and 125 then may be fully open or might be only partly open.

The regulators 115 also function to iron out or eliminate casual or transitory irregularities of pressure in the air main and because of this advantage over simple valves, preferably would be used when independent regulation of the pressure in each of the branches 101, 102 and 103 is desired.

A different way of using the controls of the air supply mechanism is to cut both the by-passes and the regulators out of two of the branch lines of the air main, open the valves of the cross connections 120 and 122 either fully or to the desired extent or extents, and supply all the air from the main that is utilized through the remaining regulator.

Another way of using the control means of the air supply system to produce still different results is to cut the three regulators out of the system, set the valves of the respective by-passes 116 as desired to obtain different pressure ratios in the different branch lines and then maintain these settings while changing the total air available by adjustment of the valve 124 of the air main. This would increase or decrease the air in the respective branches in unison, while substantially maintaining the ratios of pressures in the respective branches. In the variation of this operation, the valve 125 could be adjusted to control the pressure air passing to the by-passes of the branches 101 and 102, the valves of such by-passes having been properly adjusted, while the control of the pressure of the line 103 would be controlled independently by the valved by-pass of that branch.

Still other combinations of these controls may be employed to produce still different results, considered from the view-point of relative air pressures in the respective air conducting branches. Since these air pressures produce substantially uniform ratios of gas to air in the fuel mixtures and control the pressures at which such fuel mixtures are supplied to the combustion or firing tunnels of the different sections or zones of the forehearth, it will be understood that the heating system which the invention provides and which makes use of this adjustable air supply mechanism is extremely flexible and covers a wide range of variations. Thus, a temperature gradient in the forehearth suitable for any given condition can be produced and this gradient can be changed as required to meet such other different conditions as are likely to be encountered in the range of uses for which the forehearth is adapted.

The device shown in Fig. 11 at 126 is a two-way air proportioning or distributing valve which may be used, in conjunction with a pressure regulator 127, to connect the branches 101 and 102 with the air main 100. In this assembly, the valve 126 and the single regulator 127, which is similar to the regulators 115, are substituted for the two regulators 115 and the associate by-pass connections of the branches 101 and 102, as shown in Fig. 10. Gauges 119 are provided in the branches 101 and 102, as in the arrangement shown in Fig. 10.

The effect of this change of structure would be to proportion the air under pressure obtained from the pressure regulator 127 to the two branches 101 and 102, according to the setting of the valve 126. Thus, the pressure regulator 127 may be set to provide air under a pressure of, say 15 pounds, and the valve 126 may be set so that the ratio of this air supplied to the branch 101 to that supplied to the branch 102 would be in the order of 2-1. The gas-air mixtures supplied to the delivery chamber and to the heating section of the forehearth rearwardly of the delivery chamber may be changed in unison while maintaining the same relative proportions, as by adjustment of the regulator 127 without adjustment of the valve 126. Or, the proportions may be changed without adjusting the total amount of control air supplied, as by adjustment of the valve 126, without adjustment of the regulator 127. Of course, both the regulator 127 and the valve 126 may be adjusted to produce combinations of these two results.

A forehearth constructed substantially as herein described and equipped with a heating system as described is especially well adapted for regulably controlling the temperature and condition of glass that is to be fed for the production of glassware within a range of sizes from the smallest articles which can be produced to articles of substantial size. The principles of the invention may, however, be employed in a forehearth in which the reduction of temperature is to be relatively great, as for the production of very large articles of glassware. This may be done by making the cooling section of the forehearth substantially wider than the heating section without necessarily making any further changes of structure or by special cooling provisions at the top of the cooling section, such for example as those which are disclosed in our copending application, Serial No. 41,881, aforesaid, or in the copending application of William T. Honiss, Serial No. 134,331, filed April 1, 1937.

In the use of the particular forehearth that is illustrated in the accompanying drawings and has been described in detail herein, the glass is heated or cooled as it passes through the so-called cooling section, so that the average temperature of the glass as it passes from the section is the temperature that is desired for the charges as obtained at the feed outlet in the bottom of the delivery chamber. Usually some cooling is required. This is effected by radiation of heat from the glass to and through the roof of the cooling section while the edges of the glass therein are being heated from the combustion tunnels.

In the heating or homogenizing section, a temperature condition is produced by the uniform combustion in the firing or combustion tunnels of that section and the absence from the heating section of uncontrolled currents of flame or heated gases, so that the temperature of the glass will be equalized and evened out as such glass passes through the heating section to the delivery chamber.

The delivery chamber is really an extension of the homogenizing section in which the glass has already been brought to a uniform temperature. It maintains the body of the glass flowing into it at this temperature. It may, however, be used to raise the temperature of the outer edge portions of the glass above this temperature so as to compensate for the cooling effect of the walls and bottom of this chamber. Then by the time the glass issues from the feed outlet it issues in a column of substantially uniform temperature throughout. The fuel supply to the delivery chamber is independently adjustable so that the heat, radiated from the combustion or firing tunnels around the edge, may be regulated to produce this higher temperature in the glass at the edge. This also has a favorable effect on flow lines, preventing clinging of the glass to the outer walls and preventing the accumulation of dead glass in the front, which latter is a quite common difficulty in former forehearths for glass feeding. Therefore, by maintaining uniformity in the central body of glass passing into the delivery chamber, and by adding slight additional heat when required at the periphery to compensate for cooling effects, it is possible to feed glass from the outlet in which there are no hot or cold streaks.

The vents or exhaust outlets in the tops of the cooling and heating sections are controlled so as to effect removal of the spent products of combustion without interfering with uniformity of heating conditions throughout the length of these sections of the forehearth. Of course, the heating conditions produced and maintained in the cooling section of the forehearth are, or may be, substantially different from the heating conditions produced and maintained in the heating section of the forehearth. The structures and associate controls permit establishment and maintenance of suitable conditions within the cooling section, the heating section and the delivery chamber to produce uniformity of temperature and condition of the glass passing to the feed outlet and to dependably maintain these conditions while the adjustments remain the same. When it is desired to change the temperature gradient, as when a change in the size of charge is to be effected, or when the output of glass from the outlet is changed, or if the temperature of the glass entering the forehearth channel should change, appropriate regulation of the combustions in the tunnels of the cooling section and/or heating section, and/or delivery chamber may be quickly and easily effected so as to produce the required change of temperature gradient.

The tops of the several sections of the forehearth are relatively close to the surface of the glass therein and the heating means, making use as it does of the principle of heating by radiation, permits heating the edges hotter than the center. This minimizes the drag of glass at the sides and corners of the bottom, and assists in keeping the glass at these places above devitrification temperature while still permitting cooling of the body of the glass. By the influence of this edge heating on the flow lines, glass may be brought to the delivery chamber at a substantially uniform temperature and without streaks of either hot or cold glass or devitrified contamination. It does this with a relatively low fuel consumption since there is a minimum fire space above the glass to be heated.

Our improved forehearth has been found in actual commercal practice to provide desirable and advantageous stability and flexibility of operation, and ease of control. It also effects a substantial economy in the use of fuel and a consequent saving in the cost of manufacture of glassware.

The invention is not to be limited by the details herein disclosed, but extends to all structures and methods which fairly fall within the scope of the appended claims.

We claim:

1. A forehearth comprising a glass flow channel closed at its outer end, spaced elongate refractory combustion tunnels in the side and outer end walls of the forehearth above the level of the glass in the channel, each of said tunnels being generally conoidal in shape to cause combustion of gas-air mixtures therein at the inner surfaces of the walls thereof and having a larger end open at the inner surface of the wall of the forehearth channel in which said tunnel is located, means for supplying gas-air mixtures to the smaller outer ends of said combustion tunnels, means cooperating with said means for supplying gas-air mixtures to seal the smaller outer ends of said tunnels to prevent ingress of additional air to said tunnels, and means for controlling the gas-air mixtures supplied to said tunnels to produce practically complete combustion in all of said tunnels and a predetermined temperature gradient in the glass in the channel longitudinally of said channel.

2. A forehearth for flowing molten glass in a stream from a melting tank or like source of supply to a delivery chamber at the outer end of the forehearth, spaced elongate refractory combustion tunnels in the side walls of said forehearth and in the walls of the delivery chamber, each of said tunnels being generaly conoidal in shape to cause combustion of gas-air mixtures therein at the inner surfaces of the walls thereof and having a larger end open at the interior of the forehearth, means for supplying gas-air mixtures to the smaller outer ends of said tunnels, means for excluding external air from said tunnels, and adjustable control means for controlling the gas-air mixtures supplied to said tunnels to produce practically complete combustion in all of said tunnels and to permit independent adjustment of the heating effect of said combustions in a plurality of zones extending longitudinally of said forehearth.

3. A forehearth for flowing molten glass in a stream from a melting tank or like source of supply to a delivery chamber at the outer end of the forehearth, spaced elongate refractory combustion tunnels in the side walls of said forehearth and in the walls of the delivery chamber, each of said tunnels being generally conoidal in shape to cause combustion of gas-air mixtures therein at the inner surfaces of the walls thereof and having a larger end open at the interior of the forehearth, means for supplying gas-air mixtures to the smaller outer ends of said tunnels, means for excluding external air from said tunnels, and adjustable control means for controlling the gas-air mixtures supplied to said tunnels to produce practically complete combustion in all of said tunnels and to permit independent adjustment of the heating effect of said combustions in a plurality of zones extending longitudinally of said forehearth, said adjustable control means and said combustion tunnels being so constructed and arranged as to cause uniform heating effects by all the tunnels along each side and at opposite sides of each of said zones and different heating effects by the tunnels in the different zones.

4. A forehearth for molten glass comprising successive cooling and heating sections and a delivery chamber at the outer end of the heating section, spaced elongate refractory combustion tunnels in the side walls of the cooling and heating sections and in the walls of the delivery chamber, each of said tunnels being generally conoidal in shape to cause combustion of gas-air mixtures therein at the inner surfaces of the walls thereof and having a larger end open at the interior of the forehearth and means for delivering mixtures of gas and air to the smaller outer ends of all the combustion tunnels of the cooling section, the heating section and the delivery chamber in separately controllable groups or banks, means for excluding external air from all of said combustion tunnels, and means for controlling said means for delivering mixtures of gas and air to predetermine the ratio of gas to air and the pressure of the mixture delivered to the combustion tunnels of each group independently of the mixtures delivered to the other groups.

5. A forehearth for molten glass comprising successive cooling and heating sections and a delivery chamber at the outer end of the heating section, spaced elongate refractory combustion tunnels in the walls of said cooling section, said heating section and said delivery chamber, each of said tunnels being generally conoidal in shape to cause combustion of gas-air mixtures therein at the inner surfaces of the walls thereof, and means for delivering gas-air mixtures to the outer ends of said tunnels and for excluding external air therefrom, said combusttion tunnels in the side walls of said cooling and heating sections being inwardly enlarging ports having their inner ends beveled downwardly and outwardly and having their bottom walls cut away from the inner ends of the tunnels for part of their length so that the heat from said tunnels will be mainly downward onto the marginal portions of the glass in the cooling and heating sections, the combustion tunnels of the delivery chamber being inwardly enlarging ports of greater width than height at their inner ends so that the heat therefrom will be diffused horizontally in the delivery chamber and will produce a substantially uniform heating effect on the glass therein.

6. A forehearth for molten glass comprising successive cooling and heating sections and a delivery chamber at the outer end of the heating section, spaced elongate refractory combustion tunnels in the walls of said sections and of said delivery chamber, each of said tunnels being generally conoidal in shape to cause combustion of gas-air mixtures therein at the inner surfaces of the walls thereof, and means for delivering gas-air mixtures to the outer ends of said tunnels and for excluding external air therefrom, said tunnels and the adjacent walls of said forehearth being so constructed and arranged that most of the heat of combustions in the tunnels of the cooling and heating sections will be directed downwardly onto the marginal portions of the glass in those sections of the forehearth and the heat of combustions in the tunnels of the delivery chamber will be diffused more uniformly throughout the space above the glass in that chamber.

7. In a forehearth for molten glass, combustion tunnels in the side walls of a portion of said forehearth, individual nozzles for said tunnels, manifolds for said nozzles, means for detachably securing said nozzles to said manifolds so that each nozzle may receive a gas-air mixture from its manifold, means for supporting said manifolds in positions adjacent to said forehearth, means cooperative with said nozzles and the adjacent walls of said forehearth for excluding external air from said tunnels, and means for supplying gas-air mixtures to said manifolds.

8. In a forehearth, a delivery chamber comprising a feed bowl of approximate U-shape in plan, a combustion wall on said feed bowl, said combustion wall comprising a plurality of tunnel blocks, each of approximately arcuate curvature for part of its length and each having spaced combustion tunnels formed therein, removable filler blocks between adjacent ends of said tunnel blocks and at the remote ends thereof for retaining the tunnel blocks in place, fuel manifolds extending along the exterior of said combustion wall, nozzles carried by said manifolds in positions to project into said tunnels when said tunnel blocks are in operative position on said feed bowl, said tunnels being enlarged at their outer ends by notches extending through the upper surfaces of said blocks to permit clay luting or like material to be packed around the nozzles when the tunnel blocks are in their operative positions and to afford clearance for said nozzles when the tunnel blocks are moved inwardly of the delivery chamber to permit access to the underlying feed bowl, said tunnel blocks being movable inwardly as aforesaid when said filler blocks have been removed.

9. In a forehearth, a delivery chamber having a combustion wall, said combustion wall including a tunnel block of generally arcuate shape, said tunnel block having spaced combustion tunnels formed therein, said combustion tunnels being enlarged at their outer ends, nozzles of a fuel supply system projecting into the enlarged outer end portions of said tunnels, the latter being sufficiently larger than said nozzles and so formed as to provide spaces into which clay luting may be packed when the nozzles and the tunnel block are in place and to allow the block to be moved bodily in its own plane inwardly from said nozzles when desired.

10. In a forehearth, a delivery chamber having a combustion wall, said combustion wall comprising tunnel blocks of like construction at opposite sides of the longitudinal median line of the forehearth, said tunnel blocks having spaced tunnels formed therein, said blocks having their end portions nearest to the remainder of the forehearth inwardly enlarged, the inner surfaces of said inwardly enlarged portions being beveled downwardly and outwardly, certain of said tunnels extending through these inwardly enlarged beveled walls of the blocks and having their bottoms cut away at their inner ends so that heat caused by combustion in these tunnels will be directed in a direction having a downward component.

11. A refractory block for a combustion wall of a forehearth for molten glass, said block having its inner surface beveled downwardly and outwardly toward the outer surface of the block, said block having combustion tunnels comprising main portions opening at their inner ends through the beveled inner surface of the block and outer end portions adapted for association with nozzles for supplying premixed gas and air thereto, said tunnels being sufficient in number and sufficiently close together to cause practically the entire beveled inner surface of the block to be heated to incandescence by the surface combustion of premixed air and gas in said tunnels and at the inner ends thereof.

12. A refractory block for a combustion wall of the delivery chamber of a forehearth for molten glass, said block being generally arcuate in configuration as viewed from above for at least a major part of the length of the block, said block having spaced combustion tunnels formed therein, said tunnels having laterally enlarged inner end portions and having outer end portions provided with notches extending through the upper surface of the block, the outer end portions of the tunnels being adapted to receive nozzles for supplying premixed gas and air to the tunnels and the notches being adapted to provide access to the outer ends of the tunnels and to the nozzles therein to permit clay luting or like packing material to be packed into the space between said nozzles and the adjacent walls of the tunnel.

13. The method of controlling the temperature and condition of molten glass in a forehearth which comprises causing practically complete combustion of premixed gas and air at the surfaces of the internal and inner end walls of combustion tunnels located at spaced intervals along the side walls and the wall at the outer end of the space above the glass in the forehearth to heat the glass in the outer end portion of the forehearth and the side edge portions of the glass in the remainder of the forehearth by radiation from the inner end walls of the tunnels and the portions of the forehearth walls adjacent thereto, and producing a predetermined temperature gradient in the glass in the forehearth longitudinally thereof by controlling the combustions in said tunnels and the heating effects thereof in a plurality of zones extending longitudinally of the forehearth.

14. The method of controlling the temperature and condition of molten glass in a forehearth which comprises causing practically complete combustion of premixed gas and air at the surfaces of the internal and inner end walls of combustion tunnels located at spaced intervals along the side walls and the wall at the outer end of the space above the glass in the forehearth to heat the glass in the outer end portion of the forehearth and the side edge portions of the glass in the remainder of the forehearth by radiation from the inner end walls of the tunnels and the portions of the forehearth walls adjacent thereto, producing a predetermined temperature gradient in the glass in the forehearth longitudinally thereof by controlling the combustion in said tunnels and the heating effects thereof in a plurality of zones extending longitudinally of the forehearth, and altering said temperature gradient by varying the combustions in the tunnels of one of said zones.

15. The method of controlling the temperature and condition of molten glass in a forehearth having a feed outlet in the bottom of a delivery chamber at the outer end of the forehearth, comprising causing practically complete combustion of gas-air mixtures of like compositions and pressure at the surfaces of the internal and inner end walls of spaced combustion tunnels located in each of the side walls of a rear section of the forehearth to heat by radiation the side edge portions of the glass therein uniformly both longitudinally of said section and at opposite sides thereof and simultaneously cooling the glass in said section uniformly from its longitudinal median line toward its side edges to bring all the glass passing from said rear section to an average temperature corresponding to that desired in the glass at the outlet, causing practically complete combustion of gas-air mixtures of like compositions and pressure at the surfaces of the internal and inner end walls of spaced combustion tunnels located in the sides of a heating section of the forehearth intervening between said rear section and the delivery chamber to subject the glass in the heating section to a temperature regulating influence appropriate to cause the said average temperature to become uniform throughout the glass passing from said heating section to the delivery chamber, and causing practically complete combustion of gas-air mixtures of like compositions and pressure at the surfaces of the internal and inner end walls of spaced combustion tunnels located in the wall of the delivery chamber to subject the glass in the delivery chamber to radiant heat of sufficient intensity and distribution to maintain all the glass passing to the feed outlet of the delivery chamber uniformly at the aforesaid desired temperature.

16. The method of controlling the thermal condition of molten glass for mold charges which comprises flowing glass in a stream in a forehearth from a source of supply to a delivery chamber from which the charges of glass are to be obtained, heating the side edge portions of the stream and controlling the loss of heat from the glass of the remainder of the stream for part of the travel of said stream so that the temperature of the side edge portions of the stream will be substantially higher than the temperature of the glass of the remainder of the stream during that part of its travel, and the average temperature of the glass transversely of the stream at the end of said part of its travel is approximately the temperature desired for the glass of the mold charges, then regulating the temperature of the glass of the stream during the remainder of its travel to said delivery chamber to cause said average temperature to become substantially uniform transversely of the stream at the time such stream reaches the delivery chamber, and regulating the temperature of the glass in the delivery chamber substantially to maintain said uniformity of temperature of the glass while such glass is in the delivery chamber.

17. A forehearth having a glass flow channel and an enclosed space above the glass therein, said forehearth having spaced substantially horizontal burner ports in the form of elongate continuous tunnels extending transversely through the side walls of said space, said burner ports enlarging in diameter from their outer to their inner ends and being of sufficient length to constitute combustion chambers, and means for introducing premixed air and gas, of such characteristics and pressure that practically complete combustion thereof will take place in such burner ports, into the outer ends of said burner ports, the burner ports of the rear portion of said forehearth having their bottom walls cut away from their inner ends for part of their length to radiate heat downwardly onto the edge portions of the glass in the underlying portion of the flow channel as combustion takes place in such ports.

KARL E. PEILER.
WILLIAM T. BARKER, Jr.